(12) United States Patent
Allam et al.

(10) Patent No.: US 11,174,759 B2
(45) Date of Patent: Nov. 16, 2021

(54) SYSTEMS AND METHODS FOR POWER PRODUCTION USING NESTED $CO_2$ CYCLES

(71) Applicant: 8 Rivers Capital, LLC, Durham, NC (US)

(72) Inventors: Rodney John Allam, Wiltshire (GB); Brock Alan Forrest, Durham, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 156 days.

(21) Appl. No.: 16/547,210

(22) Filed: Aug. 21, 2019

(65) Prior Publication Data
US 2019/0376419 A1 Dec. 12, 2019

Related U.S. Application Data

(62) Division of application No. 15/252,798, filed on Aug. 31, 2016, now Pat. No. 10,422,252.
(Continued)

(51) Int. Cl.
*F01K 23/04* (2006.01)
*F01K 25/08* (2006.01)
(Continued)

(52) U.S. Cl.
CPC ............ *F01K 23/04* (2013.01); *F01K 7/16* (2013.01); *F01K 23/10* (2013.01); *F01K 25/08* (2013.01);
(Continued)

(58) Field of Classification Search
CPC .......... F01K 23/04; F01K 23/10; F01K 25/08; F01K 25/103; F01K 7/16; F02C 1/007; F02C 1/06; F02C 1/08; F02C 3/34; F02C 6/18; F05D 2260/61; F25J 2230/06; F25J 2240/70; F25J 2260/80; F25J 3/04018;
(Continued)

(56) References Cited

U.S. PATENT DOCUMENTS 4,498,289 A 2/1985 Osgerby
5,142,869 A 9/1992 Iizuka et al.
(Continued)

FOREIGN PATENT DOCUMENTS

EP 0831 205 3/1998
GB 2484080 4/2012
WO WO 2012-128928 9/2012

OTHER PUBLICATIONS

E.I. Yantovskii et al., "Computer Exergonomics of Power Plants Without Exhaust Gases," Energy Convers. Mgmt., Publ. 1992, vol. 33, No. 5-8, pp. 405-412.
(Continued)

*Primary Examiner* — Jesse S Bogue
(74) *Attorney, Agent, or Firm* — Womble Bond Dickinson (US) LLP (57) ABSTRACT

The present disclosure relates to systems and methods useful for power production. In particular, a power production cycle utilizing $CO_2$ as a working fluid may be combined with a second cycle wherein a compressed $CO_2$ stream from the power production cycle can be heated and expanded to produce additional power and to provide additional heating to the power production cycle.

7 Claims, 2 Drawing Sheets

Related U.S. Application Data (60) Provisional application No. 62/212,749, filed on Sep. 1, 2015.

(51) Int. Cl.

| | |
|---|---|
| *F01K 7/16* | (2006.01) |
| *F01K 23/10* | (2006.01) |
| *F01K 25/10* | (2006.01) |
| *F02C 1/00* | (2006.01) |
| *F02C 3/34* | (2006.01) |
| *F02C 1/06* | (2006.01) |
| *F02C 1/08* | (2006.01) |
| *F02C 6/18* | (2006.01) |
| *F25J 3/04* | (2006.01) |

(52) U.S. Cl.
CPC ............ *F01K 25/103* (2013.01); *F02C 1/007* (2013.01); *F02C 1/06* (2013.01); *F02C 1/08* (2013.01); *F02C 3/34* (2013.01); *F02C 6/18* (2013.01); *F25J 3/04018* (2013.01); *F25J 3/04024* (2013.01); *F25J 3/04133* (2013.01); *F25J 3/04145* (2013.01); *F25J 3/04533* (2013.01); *F25J 3/04618* (2013.01); *F05D 2260/61* (2013.01); *F25J 2230/06* (2013.01); *F25J 2240/70* (2013.01); *F25J 2260/80* (2013.01); *Y02E 20/16* (2013.01); *Y02E 20/34* (2013.01)

(58) Field of Classification Search
CPC .. F25J 3/04024; F25J 3/04133; F25J 3/04145; F25J 3/04533; F25J 3/04618; Y02E 20/16; Y02E 20/34
See application file for complete search history.

(56) References Cited

U.S. PATENT DOCUMENTS

| | | | |
|---|---|---|---|
| 5,345,756 A | 9/1994 | Jahnke et al. | |
| 5,687,559 A | 11/1997 | Sato | |
| 5,724,805 A | 3/1998 | Golomb et al. | |
| 5,802,840 A * | 9/1998 | Wolf | F01K 25/103 60/772 |
| 6,170,264 B1 | 1/2001 | Viteri et al. | |
| 6,196,000 B1 | 3/2001 | Fassbender | |
| 6,269,624 B1 | 8/2001 | Frutschi et al. | |
| 6,389,814 B2 | 5/2002 | Viteri et al. | |
| 6,598,398 B2 | 7/2003 | Viteri et al. | |
| 6,622,470 B2 | 9/2003 | Viteri et al. | |
| 6,637,183 B2 | 10/2003 | Viteri et al. | |
| 6,684,643 B2 * | 2/2004 | Frutschi | F01K 25/103 60/39.52 |
| 6,824,710 B2 | 11/2004 | Viteri et al. | |
| 6,871,502 B2 | 3/2005 | Marin et al. | |
| 6,910,335 B2 | 6/2005 | Viteri et al. | |
| 6,918,253 B2 | 7/2005 | Fassbender | |
| 6,945,029 B2 | 9/2005 | Viteri | |
| 6,945,052 B2 | 9/2005 | Frutschi et al. | |
| 7,021,063 B2 | 4/2006 | Viteri | |
| 7,043,920 B2 | 5/2006 | Viteri et al. | |
| 7,089,743 B2 | 8/2006 | Frutschi et al. | |
| 8,596,075 B2 | 12/2013 | Allam et al. | |
| 8,776,532 B2 | 7/2014 | Allam et al. | |
| 8,986,002 B2 | 3/2015 | Palmer et al. | |
| 9,014,791 B2 | 4/2015 | Held | |
| 9,068,743 B2 | 6/2015 | Palmer et al. | |
| 9,145,795 B2 | 9/2015 | Lehar et al. | |
| 9,689,309 B2 | 6/2017 | Oelfke et al. | |
| 9,869,272 B1 | 1/2018 | Stuart et al. | |
| 2002/0134085 A1 | 9/2002 | Frutschi | |
| 2004/0148941 A1 | 8/2004 | Wylie | |
| 2007/0006565 A1 | 1/2007 | Fleischer et al. | |
| 2007/0125063 A1 | 6/2007 | Evulat | |
| 2009/0117024 A1 | 5/2009 | Weedon et al. | |
| 2009/0320438 A1 | 12/2009 | Koganezawa et al. | |
| 2010/0024421 A1 | 2/2010 | Litwin et al. | |
| 2010/0144837 A1 | 6/2010 | Wands et al. | |
| 2010/0175385 A1 | 7/2010 | Plant et al. | |
| 2010/0300063 A1 | 12/2010 | Palmer et al. | |
| 2010/0326084 A1 | 12/2010 | Anderson et al. | |
| 2011/0120139 A1 | 5/2011 | Abraham et al. | |
| 2011/0127773 A1 | 6/2011 | Freund et al. | |
| 2011/0138766 A1 | 6/2011 | El Kady et al. | |
| 2011/0179799 A1 | 7/2011 | Allam et al. | |
| 2011/0185701 A1 | 8/2011 | Koda et al. | |
| 2011/0248513 A1 | 10/2011 | Pavone et al. | |
| 2011/0265698 A1 | 11/2011 | Hirson et al. | |
| 2011/0304155 A1 | 12/2011 | Hoffmann et al. | |
| 2012/0067054 A1 | 3/2012 | Palmer et al. | |
| 2012/0067056 A1 | 3/2012 | Palmer et al. | |
| 2012/0073261 A1 | 3/2012 | Palmer et al. | |
| 2012/0237881 A1 | 9/2012 | Allam et al. | |
| 2013/0104525 A1 | 5/2013 | Allam et al. | |
| 2013/0104563 A1 | 5/2013 | Oelfke et al. | |
| 2013/0118145 A1 | 5/2013 | Palmer et al. | |
| 2013/0145773 A1 | 6/2013 | Kulkarni et al. | |
| 2013/0160456 A1 | 6/2013 | Snook et al. | |
| 2013/0199150 A1 | 8/2013 | Zhang et al. | |
| 2013/0199195 A1 * | 8/2013 | Allam | F01K 13/00 60/772 |
| 2013/0205746 A1 | 8/2013 | Allam et al. | |
| 2013/0213049 A1 * | 8/2013 | Allam | F23L 7/00 60/773 |
| 2013/0269334 A1 | 10/2013 | Sonwane et al. | |
| 2013/0269346 A1 | 10/2013 | Li et al. | |
| 2013/0305732 A1 | 11/2013 | Benz et al. | |
| 2013/0333391 A1 | 12/2013 | Sundaram et al. | |
| 2014/0013766 A1 | 1/2014 | Mittricker et al. | |
| 2014/0053529 A1 * | 2/2014 | Allam | F25J 3/04618 60/39.182 |
| 2014/0083109 A1 | 3/2014 | Oelfke et al. | |
| 2014/0150699 A1 | 6/2014 | Schneider et al. | |
| 2014/0230401 A1 | 8/2014 | Dunn | |
| 2014/0250902 A1 | 9/2014 | Kraft | |
| 2015/0089956 A1 | 4/2015 | Wang et al. | |
| 2015/0107258 A1 | 4/2015 | Rofa et al. | |
| 2015/0113940 A1 | 4/2015 | Sinatov et al. | |
| 2015/0113988 A1 | 4/2015 | Ichinose et al. | |
| 2015/0167554 A1 | 6/2015 | Cho et al. | |
| 2015/0240665 A1 | 8/2015 | Stapp | |
| 2016/0010551 A1 | 1/2016 | Allam et al. | |
| 2016/0053638 A1 | 2/2016 | Stapp | |
| 2017/0010176 A1 | 1/2017 | Inoue | |
| 2017/0022844 A1 | 1/2017 | Bastnagel et al. | |
| 2017/0058834 A1 | 3/2017 | Vaisman et al. | |
| 2017/0101931 A1 | 4/2017 | Armstrong et al. | |
| 2017/0138222 A1 | 5/2017 | Sundaram et al. | |
| 2017/0306844 A1 | 10/2017 | Forrest et al. | |
| 2017/0350279 A1 | 12/2017 | Kobayashi et al. | |
| 2018/0073430 A1 | 3/2018 | Forrest et al. | |
| 2018/0073804 A1 | 3/2018 | Allam | |
| 2018/0133647 A1 | 5/2018 | Lu et al. | |
| 2018/0171870 A1 | 6/2018 | Salek et al. | |
| 2018/0195417 A1 | 7/2018 | Baik et al. | |
| 2019/0024583 A1 | 1/2019 | Lu et al. | |

OTHER PUBLICATIONS

Hong et al., "Analysis of Oxy-Fuel Combustion Power Cycle Utilizing a Pressurized Coal Combustor," *Energy*, Available Online Jun. 21, 2009, pp. 1332-1340, vol. 34, No. 9.

Iantovski et al., "Highly Efficient Zero Emission $CO_2$-Based Power Plant" *Energy Convers. Mgmt*, 1997, Suppl. pp. S141-S146, vol. 38.

Mathieu et al., "Sensitivity Analysis of the MATIANT Cycle," *Energy Conversion & Management*, 1999, pp. 1687-1700, vol. 40.

* cited by examiner

SYSTEMS AND METHODS FOR POWER PRODUCTION USING NESTED $CO_2$ CYCLES

CROSS-REFERENCE TO RELATED APPLICATIONS

The present application is a continuation of U.S. application Ser. No. 15/252,798, filed Aug. 31, 2016, which claims priority to U.S. Provisional Patent Application No. 62/212,749, filed Sep. 1, 2015, the disclosures of which are incorporated herein by reference in their entirety.

FIELD OF THE INVENTION

The present disclosure provides power production systems and methods wherein a power production cycle utilizing a $CO_2$ circulating fluid can be improved in its efficiency. In particular, a compressed $CO_2$ stream from the power production cycle can be heated with an independent heat source and expanded to produce additional power and to provide additional heating for the power production cycle.

BACKGROUND

The most common power cycle currently employed using natural gas fuel is the gas turbine (GT) in combination with a heat recovery steam generator (HRSG). Such system may be referred to as a natural gas fired combined cycle (NGCC) wherein an advanced steam Rankine cycle power generation system (HRSG plus steam turbines) utilizes the hot turbine exhaust heat to form steam for further power generation. An NGCC unit is typically understood to be a highly efficient method of power generation utilizing predominately natural gas fuel. In use of an NGCC unit, all $CO_2$, water vapor, and oxides of nitrogen (NOx) derived from combustion are vented to the atmosphere.

Utilization of $CO_2$ (particularly in supercritical form) as a working fluid in power production has been shown to be a highly efficient method for power production. See, for example, U.S. Pat. No. 8,596,075 to Allam et al., the disclosure being incorporated herein by reference, which describes the use of a directly heated $CO_2$ working fluid in a recuperated oxy-fuel Brayton cycle power generation system with virtually zero emission of any streams to the atmosphere. It has previously been proposed that $CO_2$ may be utilized as a working fluid in a closed cycle wherein the $CO_2$ is repeatedly compressed and expanded for power production with intermediate heating using an indirect heating source and one or more heat exchangers. See, for example, U.S. Pat. No. 8,783,034 to Held.

Various means have been pursued for increasing efficiency in such power productions methods. For example, recuperative heat exchanger optimization has been pursued, such as via hot gas compression or through external heat sources. Optimization of $CO_2$ cycles has often focused on maximizing turbine power output. Despite such efforts, there remains a need in the field for power production systems and methods with increased efficiency and power output while limiting or substantially avoiding emission of any streams (e.g., $CO_2$, NOx, and other combustion-related products) to the atmosphere.

SUMMARY OF THE INVENTION

The present disclosure relates to systems and methods for power production wherein the efficiency of a power production cycle utilizing $CO_2$ as a work stream can be maximized while simultaneously increasing power production capacity without the need for significant changes in the equipment utilized in the power production cycle. Improvements in efficiency can be realized by supplying additional heating to the working fluid stream beyond the heating that may be recuperated through internal heat exchange, the additional heating being supplied by an external heat source that is independent of the power production cycle. In particular, an independent heat source can be used to heat at least a portion of a high pressure recycle $CO_2$ stream from the power production cycle, and the so heated stream can be rejoined to the power production cycle in a variety of manners to achieve the additional heating of the recycle $CO_2$ work stream. Advantageously, the so-heated recycle $CO_2$ stream can be expanded for additional power production and to condition the so-heated recycle $CO_2$ stream for rejoining the primary power production cycle at a pressure that avoids the requirement of additional equipment.

In some embodiments, the present disclosure thus provides a power production method comprising: a first power production cycle wherein a recycled $CO_2$ stream is subjected to repeated compression, heating, combustion, expansion for power production, and cooling; and a second power production cycle wherein compressed $CO_2$ from the first power production cycle is heated with a heat source that is independent of the first power production cycle, expanded for power production, and recombined with the recycled $CO_2$ stream in the first power production cycle. In particular, the heating carried out in the first power production cycle upstream from the combustion can include receiving the heat that is provided to the compressed recycled $CO_2$ in the second power production cycle. For example, the heating in the first power production cycle can comprise passing the recycled $CO_2$ stream through a recuperative heat exchanger against a cooling turbine discharge stream, and the compressed $CO_2$ stream heated in the second power production cycle can be passed through the recuperative heat exchanger (or a specific segment or unit thereof) to impart additional heating to the recycled $CO_2$ stream in the first power production cycle. As another non-limiting example, the first power production cycle can include a secondary heat exchanger, and the compressed $CO_2$ stream heated in the second power production cycle can be passed through the secondary heat exchanger against a portion of the recycled $CO_2$ stream in the first power production cycle, which portion may then be recombined with the remaining recycled $CO_2$ stream before, during, or after passage through the recuperative heat exchanger.

The heat source in the second power production cycle can comprise any device or combination of devices configured to impart heating to a stream that is sufficient to heat a compressed $CO_2$ stream as described herein so that the compressed $CO_2$ stream achieves the desired quality and quantity of heat. As non-limiting examples, the heat source in the second power production cycle can be one or more of a combustion heat source, a solar heat source, a nuclear heat source, a geothermal heat source, and an industrial waste heat source. The heat source may include a heat exchanger, a heat pump, a power producing device, and any further combination of elements (e.g., piping and the like) suitable to form, provide, or deliver the necessary heat.

In another exemplary embodiment, a method of power production according to the present disclosure can comprise carrying out a first cycle that includes: expanding a work stream comprising recycled $CO_2$ across a first turbine to produce a first quantity of power; withdrawing heat from the work stream in a recuperative heat exchanger; compressing the work stream; reheating the work stream using withdrawn heat in the recuperative heat exchanger; and superheating the compressed work stream in a combustor. The method also can comprise carrying out a nested cycle wherein compressed work stream from the first cycle is heated with a heat source that is independent of the combustor and the recuperative heat exchanger and is expanded across a second turbine to produce a second quantity of power. In particular, the expanded work stream from the nested cycle can be used to add heat to the work stream in the first cycle after the compressing and before the superheating.

In other embodiments, the present disclosure can provide methods for improving the efficiency of a power production cycle. As a non-limiting example, such method can comprise operating the power production cycle so that compressed, recycled $CO_2$ is passed through a combustor wherein a carbonaceous fuel is combusted with an oxidant to produce an exhaust stream comprising recycled $CO_2$; the exhaust stream is expanded across a turbine to produce power and form a turbine exhaust stream comprising recycled $CO_2$; the turbine exhaust stream is cooled in a recuperative heat exchanger; the cooled turbine exhaust stream is passed through a separator to separate the recycled $CO_2$; the recycled $CO_2$ is compressed; and the compressed recycled $CO_2$ is heated by passage through the recuperative heat exchanger against the turbine exhaust stream. Such method further can comprise adding further heating to the compressed recycled $CO_2$ above the level of heating that is available from the turbine exhaust stream, the further heating being provided by withdrawing a portion of the compressed recycled $CO_2$, heating the withdrawn portion of compressed recycled $CO_2$ with a heat source that is independent of the power production cycle, and transferring heat from the withdrawn and heated compressed recycled $CO_2$ to the remaining portion of the compressed recycled $CO_2$ in the power production cycle. More particularly, such method can comprise passing the withdrawn and heated compressed recycled $CO_2$ through the recuperative heat exchanger so as to transfer heat to the compressed recycled $CO_2$ therein. Alternatively, or in addition, such method can comprise passing the withdrawn and heated compressed recycled $CO_2$ through a secondary heat exchanger to heat a recycled $CO_2$ side-stream that is thereafter combined with the remaining portion of the compressed recycled $CO_2$ in the recuperative heat exchanger. In some embodiments, such method can comprise expanding the withdrawn and heated compressed recycled $CO_2$ across a second turbine to produce power.

In further embodiments, the present disclosure also can provide power production systems. In particular embodiments, a power production system can comprise: a compressor configured to compress a $CO_2$ stream to a pressure of at least about 100 bar (10 MPa); a combustor downstream from the compressor; a first turbine downstream from the combustor and upstream from the compressor; a first heat exchanger positioned to receive a stream from the compressor and to receive a separate stream from the turbine and configured to transfer heat between the streams; a second turbine downstream from the compressor; and a second heat exchanger positioned to receive a stream from the compressor and to receive a separate stream from a heat source.

In addition to the foregoing, the presently disclosed systems and methods can be characterized in relation to one or more of the following.

An external heat source (such as a gas turbine) can be integrated with a power system using $CO_2$ as the working fluid.

A stream derived from an external heat source (e.g., an exhaust stream from a gas turbine) can be cooled against a heating high pressure recycle $CO_2$ stream. Optionally, the stream derived from the external heat source can be further heated in via combustion of a carbonaceous fuel.

A high pressure recycle $CO_2$ stream heated by an external heat source can be expanded in a power producing turbine. Discharge from the turbine can be configured to correspond to an inlet, intermediate, or outlet pressures of a $CO_2$ recycle compressor in a stand-alone power production cycle (such as an Allam cycle described in the Example) while the turbine inlet temperature can correspond to the discharge pressure of the $CO_2$ pump in the stand-alone power production cycle.

In some embodiments, the high pressure recycle $CO_2$ stream heated by the external heat source can be heated to a temperature of about 400° C. to about 1500° C., preferably about 700° C. to about 1300° C. The provision of heat in such temperature range can be particularly beneficial for achieving the improvements that are described herein.

In other embodiments, an auxiliary turbine discharge flow at elevated temperature can be used to provide additional heat required to heat $CO_2$ in the temperature range from ambient up to 500° C. due to the much higher specific heat of the $CO_2$ in the pressure range of about 200 bar (20 MPa) to about 400 bar (40 MPa) compared to specific heat above 500° C. Such addition of heat in a lower temperature range can be specifically delineated from the heating provided to the high pressure recycle $CO_2$ stream, as otherwise described herein. Although the addition of heat in the lower temperature range can be useful in improving efficiency of the combustion cycle, the addition of the heat in the lower temperature range need not necessarily be combined with the addition of heating in the greater temperature range.

If desired, additional heating of the high pressure recycle $CO_2$ streams in the temperature range below 250° C. can be beneficial using heat derived from the adiabatic main air compressor of a cryogenic air separation plant, which provides the oxygen required for the system.

The presently disclosed systems and methods are beneficial in some embodiments in that the ability is provided to combine systems such that one or more pieces of equipment can be shared. The combination can provide for multiple benefits, including providing for increased energy production and providing for reductions in capital expenditures in relation to increased Kw capacity. Moreover, the combinations are not necessarily limited to certain overlapping operating temperature ranges. Rather, a system operating in any temperature range may beneficially be combined with a power production cycle utilizing $CO_2$ as a work stream (as generally described herein) and achieve the desired improvements.

BRIEF DESCRIPTION OF THE DRAWINGS

Having thus described the disclosure in the foregoing general terms, reference will now be made to the accompanying drawings, which are not necessarily drawn to scale, and wherein:

DETAILED DESCRIPTION

The present subject matter will now be described more fully hereinafter with reference to exemplary embodiments thereof. These exemplary embodiments are described so that this disclosure will be thorough and complete, and will fully convey the scope of the subject matter to those skilled in the art. Indeed, the subject matter can be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure provides systems and methods wherein a first power production cycle utilizing $CO_2$ as a work stream can be combined with a second, or nested, power production cycle wherein a least a portion of the same $CO_2$ work stream can be subjected to additional treatment resulting in additional power production and/or heat production. In such systems and methods, high efficiencies can be achieved. In particular, recuperative heat exchange in the first power production cycle can be improved while added power production can be simultaneously achieved. The additional treatment in the second power production cycle can include heating with a heat source that is independent of any heating utilized in the first power production cycle. The combination of the second power production cycle with the first power production cycle can be beneficial at least in part because of the ability to overlap the cycles so that one or more pieces of machinery may be utilized in both cycles. For example, a compressor utilized in the first power production cycle can also be used as the compressor in the second power production cycle. The present disclosure thus may be characterized in relation to the combination of at least one directly heated flow of $CO_2$ and at least one indirectly heated flow of $CO_2$ that utilize shared turbo-machinery to provide at least the benefit of increased power output while simultaneously performing optimization of a recuperative heat exchanger. The indirectly heated flow of $CO_2$ can, in some embodiments, comprise at least a portion of the $CO_2$ from the directly heated flow. Thus, a single recycle $CO_2$ stream can be subject to compression to form a high pressure stream as defined herein, split into a stream that is indirectly heated and a stream that is directly heated, and recombined after the respective heating steps. Alternatively, a single recycle $CO_2$ stream can be subject to compression to form a high pressure stream, a portion of the high pressure recycle $CO_2$ stream can be indirectly heated to form an indirectly heated $CO_2$ stream, and the indirectly heated $CO_2$ stream can be combined with the remaining recycle $CO_2$ stream to form a total recycle $CO_2$ stream that is subject to direct heating.

In some embodiments, a high pressure stream from a first power production cycle (e.g., a high pressure recycle $CO_2$ stream) can be heated by an independent heat source in a second power production cycle. The heated stream can then be supplied to an expander adapted for power production. The expanded stream can then be inserted back to the first power production cycle in a variety of manners that beneficially can impart heating to the first power production cycle beyond heating that is available through recuperation from a cooled turbine exhaust stream. The discharge pressure from the expander in the second power production cycle can be adapted so that the expanded stream may be inserted to the first power production cycle at the appropriate pressure for the point of insertion. Heating provided to the first power production cycle in this manner can be added in a variety of manners. For example, the expanded stream from the second power production cycle may be used directly (in part or in total) as a heating stream in a recuperative heat exchanger wherein high pressure recycle $CO_2$ is being re-heated prior to entry to a combustor in the first power production cycle. As an alternative example, the expanded stream from the second power production cycle may be used indirectly, such as being used as a heating stream in a further heat exchanger whereby a separate stream is heated for use as a heating stream in the recuperative heat exchanger.

A power production cycle useful as a first power production cycle according to the present disclosure can include any system and method wherein $CO_2$ (particularly supercritical $CO_2$—or $sCO_2$) is used in a work stream. As a non-limiting example, U.S. Pat. No. 8,596,075 to Allam et al., which is incorporated herein by reference, describes a system and method wherein a recycle $CO_2$ stream is directly heated and used in power production. Specifically, the recycle $CO_2$ stream is provided at high temperature and high pressure, is provided to a combustor wherein a carbonaceous fuel is combusted in oxygen, is expanded across a turbine to produce power, is cooled in a heat exchanger, is purified to remove water and any other impurities, is pressurized, is re-heated using the heat taken from the turbine exhaust, and is again passed to the combustor to repeat the cycle. Such system and method are beneficial in that all fuel and combustion derived impurities, excess $CO_2$, and water are removed as a liquid or a solid (e.g., ash), and there is virtually zero atmospheric emission of any streams. The system and method achieves high efficiency through, for example, the use of low temperature level (i.e., less than 500° C.) heat input after the recycle $CO_2$ stream has been re-pressurized and before combustion.

A power production cycle useful as a first power production cycle according to the present disclosure can include more steps or fewer steps than described above and can generally include any cycle wherein a high pressure recycle $CO_2$ stream is expanded for power production and recycled again for further power production. As used herein, a high pressure recycle $CO_2$ stream can have a pressure of at least 100 bar (10 MPa), at least 200 bar (20 MPa), or at least 300 bar (30 MPa). A high pressure recycle $CO_2$ stream can, in some embodiments, have a pressure of about 100 bar (10 MPa) to about 500 bar (50 MPa), about 150 bar to about 450 bar (45 MPa), or about 200 bar (20 MPa) to about 400 bar (40 MPa). Reference to a high pressure recycle $CO_2$ stream herein may thus be a $CO_2$ stream at a pressure within the foregoing ranges. Such pressures also apply to references to other high pressure streams described herein, such as a high pressure work stream comprising $CO_2$.

In some embodiments, a power production method according to the present disclosure can comprise combining a first power production cycle with a second power production cycle. In particular, the first power production cycle can be a cycle wherein a recycled $CO_2$ stream is subjected to repeated compression, heating, combustion, expansion for power production, and cooling. The second power production cycle can be a cycle wherein compressed recycled $CO_2$ from the first power production cycle is heated with a heat source that is independent of the first power production cycle, expanded for power production, and recombined with the recycled $CO_2$ stream in the first power production cycle.

Figure 1:
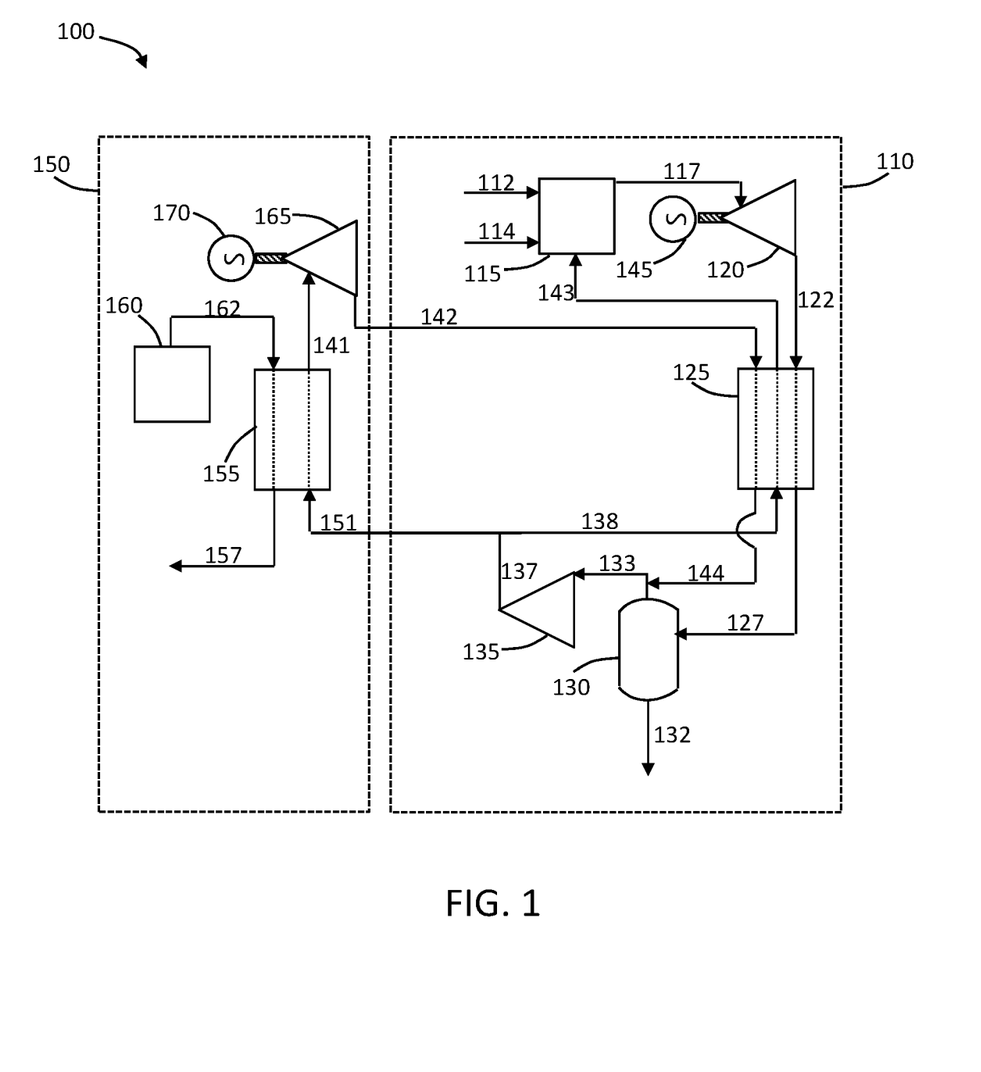
FIG. 1 is a flow diagram of an exemplary system and method of power production according to the present disclosure.

As a non-limiting example, a power production system 100 and method of use thereof is illustrated in FIG. 1. Therein, a first power production cycle 110 includes a combustor 115 where a carbonaceous fuel feed 112 and an oxidant feed 114 are combusted in the presence of a recycle $CO_2$ stream 143 to form a high pressure, high temperature combustion product stream 117 that is expanded in a turbine 120 to produce power with a generator 145. The exhaust stream 122 from the turbine 120 at high temperature is cooled in a recuperative heat exchanger 125 to produce a low pressure, low temperature $CO_2$ stream 127 that is passed through a separator 130 with condensed products 132 (e.g., water) and a substantially pure recycle $CO_2$ stream 133 exiting therefrom. The substantially pure recycle $CO_2$ stream 133 is compressed in compressor 135 to form a high pressure recycle $CO_2$ stream 137 that is split into a first portion recycle $CO_2$ stream 138 and a second portion recycle $CO_2$ stream 151. The first portion recycle $CO_2$ stream 138 is passed to the recuperative heat exchanger 125 where it is heated against the cooling turbine exhaust stream 122.

A second power production cycle 150 includes a heat source 160 that may be, for example, a gas turbine that produces a high temperature, high pressure exhaust stream 162. The heated exhaust stream 162 is passed through a heat exchanger 155 wherein it is cooled against the heating second portion recycle $CO_2$ stream 151 withdrawn from the first power production cycle 110. Although the heat source 160 is illustrated as a single element, it is understood that a plurality of heat sources may be used. For example two or more gas turbines may be used in parallel, or a combination of different types of heat sources (e.g., a gas turbine combined with a waste heat source) may be used. The cooled stream 157 exiting the heat exchanger 155 may be vented as illustrated. In other embodiments, the cooled stream may be subjected to one or more treatments. In further embodiments, the cooled stream 157 may be recycled to the heat source 160 to be again heated.

The heat source 160 may be any source adapted to provide a stream at a sufficiently high temperature. In particular, the heat source may be characterized as being independent of the first power production cycle. An independent heat source may be a heat source that is external to the power production cycle and thus does not otherwise participate in the power production cycle. For example, in FIG. 1, a single combustor 115 is illustrated. The addition of a second combustor would be understood to be a further heat source but would not be considered to be an external heat source or a heat source that is independent from the power production cycle since the second combustor would directly heat the recycled $CO_2$ stream and the production of the heat through combustion would directly affect the operating parameters of the further elements of the power production cycle. As seen in FIG. 1, the heat source 160 is independent from the first power production cycle 110 because the recycled $CO_2$ stream is never directly heated by the heat source 160. Rather, the heat source 160 provides heating that is indirectly added to the recycled $CO_2$ stream by counter flow through the heat exchanger 155.

As non-limiting examples, the independent heat source that provides indirect heating to the recycled $CO_2$ stream can be one or more of a combustion heat source (e.g., a gas turbine), a solar heat source, a nuclear heat source, a geothermal heat source, or an industrial waste heat source. In further embodiments, energy may be supplied using a source that is substantially non-heating but that is combined with a heat generating element. For example, a rotating element (e.g., a wind turbine) may be coupled with a heat pump.

Returning to FIG. 1, after heating in the heat exchanger 155, the heated second portion recycle $CO_2$ stream 141 is expanded across a turbine 165 to produce power with a generator 170. The turbine exhaust stream 142 can be used in a variety of ways to impart further heating to the first portion recycle $CO_2$ stream 138. As illustrated in FIG. 1, the turbine exhaust stream 142 is passed through the recuperative heat exchanger 125 to further heat the first portion recycle $CO_2$ stream 138. Although the turbine exhaust stream 142 is shown entering the hot end of the recuperative heat exchanger, it is understood that the turbine exhaust stream 142 may be input to the recuperative heat exchanger 125 at the appropriate heating level based upon the actual temperature of the turbine exhaust stream 142. Further, in some embodiments, the turbine exhaust stream 142 may not be returned to the heat exchanger 125. Rather, stream 142 may be input to one or both of recycle $CO_2$ stream 133 and low temperature $CO_2$ stream 127. Although a single recuperative heat exchanger 125 is illustrated, a plurality of recuperative heat exchangers may be used operating at different temperature ranges, and stream 142 may be input to any one or more of said plurality of recuperative heat exchangers.

In other embodiments, the turbine exhaust stream 142 may be combined with the first portion recycle $CO_2$ stream 138 prior to entry to the recuperative heat exchanger 142. In such embodiments, for example, further compression may be provided to second portion recycle $CO_2$ stream 151 and/or heated second portion recycle $CO_2$ stream 141.

In still further embodiments, the turbine exhaust stream 142 may pass through a separate heat exchanger (not illustrated in FIG. 1). First portion recycle $CO_2$ stream 138 may be passed through the separate heat exchanger prior to entry to the recuperative heat exchanger. A side stream from the first portion recycle $CO_2$ stream 138 taken during passage through the recuperative heat exchanger at an appropriate heating range may be withdrawn and passed through the separate heat exchanger, and the heated side stream can then be recombined with the first portion recycle $CO_2$ stream at an appropriate heating range. All or a portion of the heated recycle $CO_2$ stream 143 exiting the recuperative heat exchanger 125 may be passed through the separate heat exchanger for further heating. In these exemplary embodiments, the heat provided in the second power production cycle 150 adds further heating to the first portion recycle $CO_2$ stream 138 beyond the level of heating that is available from the turbine exhaust stream 122 alone. The heated recycle $CO_2$ stream 143 is thereafter input to the combustor 115.

The turbine exhaust stream 142 from the second power production cycle 150 is cooled by passage through the recuperative heat exchanger 125 and exits the cold end thereof as recycle $CO_2$ stream 144 which, as illustrated, is recombined with the substantially pure recycle $CO_2$ stream 133 exiting the separator 130. Beneficially, the turbine 165 in the second power production cycle 150 can be operated with a desired expansion ratio so that the pressure of the turbine exhaust stream 142 is sufficiently close to a required pressure at a point in the first power production cycle where the recycle $CO_2$ stream is recombined. In some embodiments, recycle $CO_2$ stream 144 exiting the recuperative heat exchanger 125 can be at a temperature such that further cooling is beneficial. Such cooling may occur in the separator 130, for example, when the recycle $CO_2$ stream 144 is combined with stream 127 at a lower pressure. Alternatively, a recycle $CO_2$ stream 144 may pass through an added cooler (not shown in FIG. 1).

The additional heating provided by the second power production cycle as exemplified above can be particularly useful to reduce or eliminate the temperature differential that otherwise exists at the hot end of the recuperative heat exchanger because of the different specific heat capacities of the turbine exhaust entering the recuperative heat exchanger and the recycle $CO_2$ stream exiting the recuperative heat exchanger. Systems and methods as described herein are adapted to achieve such benefit by providing the necessary quantity and quality of heat as the further heating. Based on the known flow rate, pressure, and temperature of the recycle $CO_2$ stream entering the turbine in the second power production system, an expansion ratio can be chosen that allows the recycle $CO_2$ stream exiting the turbine in the second power production system to provide the minimum heat quantity and temperature needed by the recuperative heat exchanger in the first power production cycle.

A system and method as described above creates a thermodynamic closed loop nested within a first power production cycle. The gas mixture in the nested cycle is, however, allowed to interact with the direct fired flow of recycle $CO_2$ since both cycles can share pumping equipment, as well as condensing equipment if desired. For example, while the stream 144 is shown being combined with the stream 133 in FIG. 1, the stream 144 alternatively may be combined with the stream 127 prior to entry to the separator 130 and/or prior to entry to a condenser (not illustrated in FIG. 1).

Each of the first power production cycle and the second power production cycle may be capable of being carried out independently for power production. The combination thereof, however, provides particular benefits. In a first power production cycle such as shown in FIG. 1, an advantage is the ability to recuperate a significant amount of the heat from the turbine exhaust for use in re-heating the recycle $CO_2$ stream after compression and before passage to the combustor. Efficiency, however, can be limited by the ability to add enough heat to raise the temperature of the recycle $CO_2$ stream exiting the hot end of the recuperative heat exchanger to be sufficiently close to the temperature of the turbine exhaust entering the hot end of the recuperative heat exchanger. The need for input of additional heating is identified in U.S. Pat. No. 8,596,075 to Allam et al., and various possible sources of low grade heat (e.g., at a temperature of less than about 500° C.) are identified. The present disclosure further improves upon such systems and methods in that an external source of heat (i.e., heat that is completely independent of the first power production cycle) can be used to provide the additional heating needed to achieve the required recuperator efficiency while simultaneously providing significant increases in power generation without the need for significant changes to the primary equipment used in the first power production cycle. In particular embodiments, the present disclosure specifically provides for the integration of existing power stations/equipment into a power production cycle utilizing a recycle $CO_2$ stream as a work stream.

In some embodiments, the present systems and methods can be characterized as being adapted for improving the efficiency of a power production cycle. To this end, a power production cycle may be operated as otherwise described herein in relation to a first power production cycle. The power production cycle for which efficiency is improved typically can include any power production cycle whereby a working fluid comprising $CO_2$ is repeatedly cycled at least through stages of compressing, heating, expansion, and cooling. In various embodiments, a power production cycle for which efficiency can be improved may include combinations of the following steps:

combustion of a carbonaceous fuel with an oxidant in the presence of a recycled $CO_2$ stream to provide a combustion product stream at a temperature of at least about 500° C. or at least about 700° C. (e.g., about 500° C. to about 2000° C. or about 600° C. to about 1500° C.) and a pressure of at least about 100 bar (10 MPa) or at least about 200 bar (20 MPa) (e.g., about 100 bar (10 MPa) to about 500 bar (50 MPa) or about 150 bar (15 MPa) to about 400 bar (40 MPa));

expansion of a high pressure recycled $CO_2$ stream (e.g., at a pressure as noted above) across a turbine for power production;

cooling of a high temperature recycled $CO_2$ stream (e.g., at a pressure as noted above), particularly of a turbine discharge stream, in a recuperative heat exchanger;

condensing of one or more combustion products (e.g., water) in a condenser, the combustion products being present particularly in a combustion product stream that has been expanded and cooled;

separating water and/or further materials from $CO_2$ to form a recycled $CO_2$ stream;

compressing a recycled $CO_2$ stream to a high pressure (e.g., a pressure as noted above), optionally being carried out in multiple stages with inter-cooling to increase stream density; and heating a compressed recycled $CO_2$ stream in a recuperative heat exchanger, particularly heating against a cooling turbine exhaust stream.

As noted above, improved efficiency of a power production cycle particularly may be achieved by adding further heating to the compressed recycled $CO_2$ above the level of heating (e.g., recuperative heating in a heat exchanger) that is available from a turbine exhaust stream. The present disclosure achieves such further heating by utilizing a portion of the recycled $CO_2$ stream from the power production cycle. Advantageously, a nested cycle can be added to the power production cycle utilizing at least the same compression equipment as used in the power production cycle. In particularly, further heating can be provided by withdrawing a portion of the compressed recycled $CO_2$, heating the withdrawn portion of compressed recycled $CO_2$ with a heat source that is independent of the power production cycle, and transferring heat from the withdrawn and heated compressed recycled $CO_2$ to the remaining portion of the compressed recycled $CO_2$ in the power production cycle. The nested cycle thus may be substantially similar to the second power production cycle described in relation to FIG. 1.

In further embodiments, the present disclosure also relates to power production systems. In particular, such systems can comprise one or more pumps or compressors configured to compress a $CO_2$ stream to a high pressure as described herein. The systems can comprise one or more valves or splitters configured to divide the compressed $CO_2$ stream into at least a first portion $CO_2$ stream and a second portion $CO_2$ stream. The systems can comprise a first heat exchanger (or heat exchange unit comprising a plurality of sections) configured to heat the first portion $CO_2$ stream against a high temperature turbine discharge stream and a second heat exchanger configured to heat the second portion $CO_2$ stream against a heated stream from an external (or independent) heat source. The systems can comprise a first turbine configured to expand the first portion $CO_2$ stream to produce power and a second turbine configured to expand the second portion $CO_2$ stream to produce power. The systems can comprise one or more transfer elements configured to transfer heat from the heated second portion $CO_2$ stream to the first portion $CO_2$ stream. The systems can comprise a combustor configured to combust a carbonaceous fuel in an oxidant in the presence of the first portion $CO_2$ stream.

The systems of the present disclosure may be characterized in relation to a configuration as a primary power production system and a secondary power production system, the two systems having separate heat sources and at least one shared compression element (and optionally at least one shared condensing element. For example, a system according to the present disclosure can comprise a primary power production system including a compressor configured to compress a $CO_2$ stream to a high pressure as described herein, a combustor downstream from the compressor, a first turbine downstream from the combustor and upstream from the compressor, and a first heat exchanger positioned to receive a stream from the compressor and to receive a separate stream from the turbine. Optionally, a separator can be positioned downstream from the first heat exchanger and upstream from the compressor. Further optionally, a compressor can be positioned upstream from the compressor and downstream from the first heat exchanger. A system according to the present disclosure also can comprise a secondary power production system including the compressor from the primary power production system, a second turbine downstream from the compressor, and a second heat exchanger positioned to receive a stream from the compressor and to receive a separate stream from an external (or independent) heat source. The system can further comprise one or more valves or splitters downstream from the compressor and upstream from each of the first heat exchanger and the second heat exchanger.

Example

Embodiments of the present disclosure are further illustrated by the following example, which is set forth to illustrate the presently disclosed subject matter and is not to be construed as limiting. The following describes an embodiment of a power production system and method utilizing a nested $CO_2$ cycle, as illustrated in FIG. 2.

A power production cycle was modeled based on the combination of a gas turbine with a power production cycle utilizing a circulating $CO_2$ work stream, such as described in U.S. Pat. No. 8,596,075 to Allam et al., said power production cycle being referred to herein as the Allam cycle. Industrial gas turbines are efficient, low capital cost reliable systems with a long history of technical development plus large worldwide manufacturing capacity. The Allam cycle offers approximately the same efficiency as the NGCC system at the same capital cost with the advantage of capturing the whole $CO_2$ production from natural gas as a substantially pure product at pipeline pressure typically between about 100 bar (10 MPa) and about 200 bar (20 MPa). In the exemplary embodiment, a gas turbine is integrated with the Allam cycle by eliminating the entire steam power system of an NGCC plant and utilizing the hot gas turbine exhaust to provide heat for additional power generation using the $CO_2$ working fluid from the Allam cycle plus providing the required low temperature heat input into the Allam cycle to achieve maximum efficiency. This combination allows for maintaining high efficiency for the integrated system while also providing lower capital cost per Kw of installed capacity. In some embodiments, the combination of the present disclosure can be accompanied by a substantially insignificant drop in overall efficiency for the integrated system. In other embodiments, however, there can be substantially no drop in overall efficiency. In still further embodiments, the combination of the present disclosure can allow for an increase in overall efficiency for the integrated system. In the various embodiments of the present disclosure, a reduction in capital expenditures can also be a beneficial result.

Briefly, in the exemplary embodiment, hot exhaust from a gas turbine is passed through a heat recovery unit similar to an HRSG which heats a stream of high pressure (e.g., 300 bar (30 MPa) to 500 bar (50 MPa)) $CO_2$ taken as additional flow from the Allam cycle $CO_2$ recycle compression units. The heated $CO_2$ is passed through a power producing turbine which has a discharge pressure corresponding to the inlet pressure of the Allam cycle $CO_2$ pump or to the inlet pressure or intermediate pressure of the $CO_2$ cycle compressor. The discharge flow from the auxiliary turbine, which has a temperature in the range of about 200° C. to about 500° C., is then used to provide the low temperature level heating for the high pressure recycle $CO_2$ streams in the Allam cycle plus the additional heating required in the gas turbine exhaust heat exchanger. Optionally there can be additional low grade heat input to the total high pressure $CO_2$ streams by operating the cryogenic oxygen plant main air compressor adiabatically. This releases a portion of the auxiliary expander discharge flow to preheat the total natural gas input to the gas turbine and Allam cycle combustors. Optionally the gas turbine exhaust can be raised in temperature with additional fuel gas firing utilizing the residual oxygen content in the gas turbine exhaust. This increases the inlet temperature and power output of the auxiliary power turbine since the high pressure $CO_2$ stream will be heated to a higher temperature in the gas turbine exhaust heater. Optionally the cooling flow required by the Allam cycle high pressure turbine at a temperature in the range of about 300° C. to about 500° C. can be heated using the auxiliary turbine exhaust flow rather than the main Allam cycle turbine exhaust flow. The auxiliary gas turbine inlet temperature can be in the range of about 500° C. to about 900° C. No special internal or film cooling or coatings for the turbine blades will be required at these temperatures.

Figure 2:
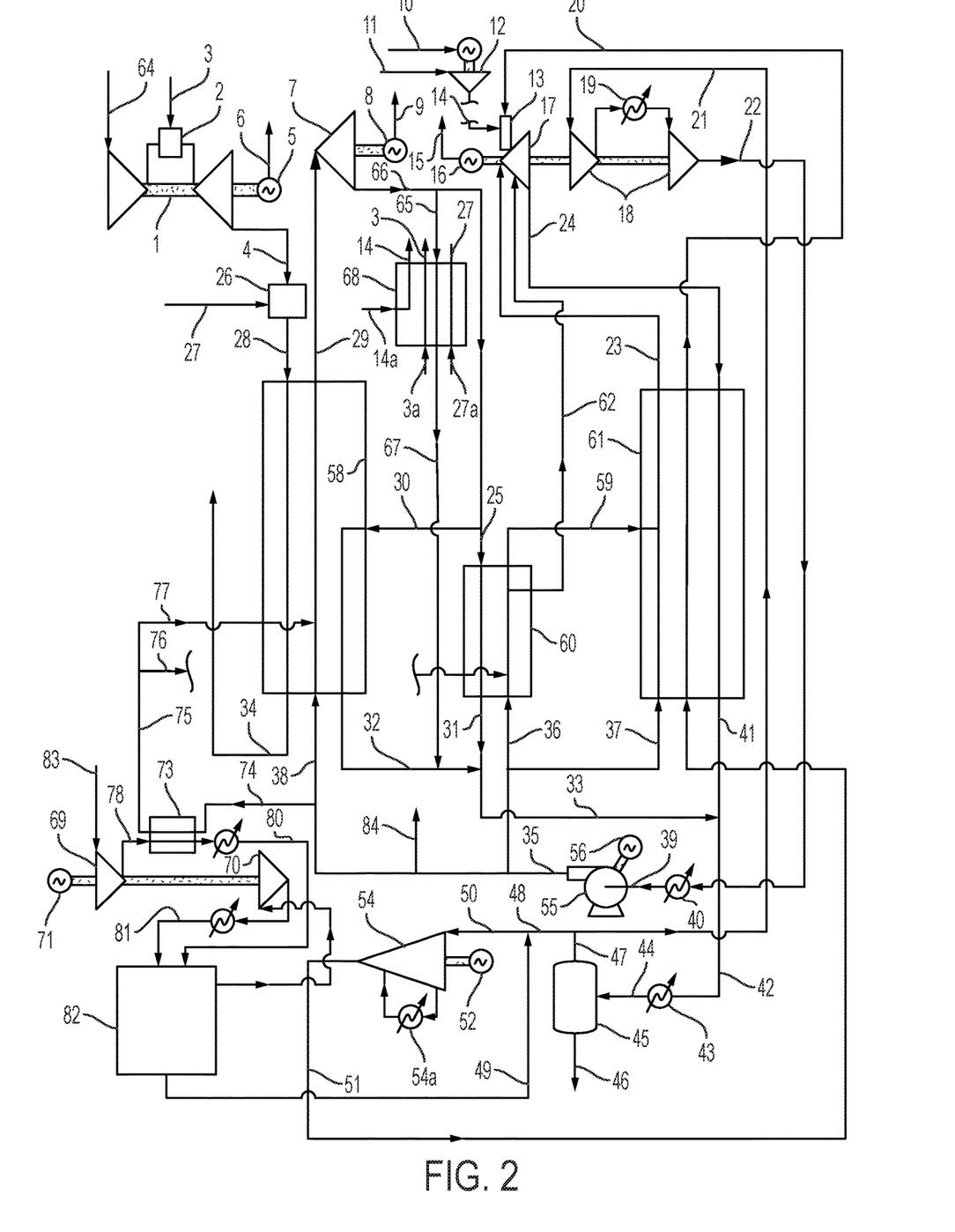
FIG. 2 is a flow diagram of a system and method of power production combining a gas turbine and a $CO_2$ cycle according to an exemplary embodiment of the disclosure.

An exemplary embodiment of an integrated system is shown in FIG. 2, the illustrated exemplary model being based on the integration of a GE7FB gas turbine and an Allam cycle power plant having the separate performance characteristics shown in Table 1 below (wherein all calculations are based on using pure methane ($CH_4$) as the fuel gas).

TABLE 1

| Parameter | 7FB NGCC System | Allam Cycle Power System |
| --- | --- | --- |
| Net Power Output | 280.3 MW | 298.2 MW |
| Natural Gas Heat Input | 488.8 MW | 510.54 MW |
| Net Efficiency | 57.3% | 58.41% |
| Condenser Vacuum | 1.7 inches Hg (0.835 psia) | NA |
| Gas Turbine Power | 183.15 MW | NA |
| $O_2$ Input (99.5 mol %) at 30 bar (3 MPa)) | NA | 3546 MT/day |
| $CO_2$ Output (97 mol % purity at 150 bar) | NA | 2556 MT/day |

Referring to FIG. 2, a GE 7FB gas turbine 1 operating at ISO conditions has an air input stream 64 entering the compressor of the gas turbine and a natural gas stream 3 entering the combustor 2 of the gas turbine. The gas turbine produces a 183.15 MW power output 6 from a coupled electric generator 5. The gas turbine exhaust 4 at 624° C. can be heated in a combustor 26 by burning an additional natural gas stream 27 producing a heated stream 28 which is passed through heat exchanger 58 to preheat a high pressure $CO_2$ recycle stream 38 at 305 bar 50° C. to produce the heated outlet stream 29 and the cooled discharge stream 34, which may be vented. The efficiency of the overall system is not changed by burning additional fuel in the 7FB gas turbine exhaust to increase the inlet temperature of the auxiliary high pressure turbine 7. The high pressure $CO_2$ recycle stream 38 is taken as an additional flow from the discharge of the Allam cycle $CO_2$ pump 55, which is coupled to electric motor 56. The turbine 7 is coupled to an electric generator 8 producing an export power stream 9. For the specific case considered the turbine 7 has been specified with an outlet pressure of 30 bar (3 MPa) and an inlet pressure of 300 bar (30 MPa). The heat input to the 7FB exhaust in burner 26 is 65.7 MW. This results in the 7FB exhaust flow 4 being heated from 624° C. to 750° C. The outlet stream 66 is at 457° C. and the 30 bar (3 MPa) discharge pressure allows this stream, following cooling, to be recompressed in the Allam cycle two stage recycle $CO_2$ compressor 18 which has an inlet pressure of 29 bar (2.9 MPa). The most favorable outlet pressures for the turbine 7 corresponds to the inlet, intermediate, and outlet pressures for the recycle $CO_2$ compressor 18, which are from 29 bar (2.9 MPa) inlet to a range of 67 bar (6.7 MPa) to 80 bar (8 MPa) outlet depending on cooling water/ambient cooling conditions.

The turbine outlet stream 66 is integrated into the system to preheat the high pressure $CO_2$ streams in an optimum manner. Stream 66 divides into 3 parts. Stream 65 enters heat exchanger 68 where it is used to preheat the natural gas streams (3a to 3, 14a to 14 and 27a to 27) to an outlet temperature of 425° C. and exit as stream 67. Stream 25 enters heat exchanger 60 where it is used to heat the 300 bar (30 MPa) 50° C. $CO_2$ stream 36 taken from the $CO_2$ pump 55 discharge stream 35 to produce the cooling stream 62 at 400° C. for the Allam cycle turbine 17, plus the externally heated recycle $CO_2$ stream at 59 at 424° C., which enters the main heat exchanger 61 at an intermediate point. Stream 30 enters the 7FB exhaust cooler 58 at an intermediate point and provides additional heating in the lower temperature section, exiting as stream 32. These three separate heat exchange duties for the auxiliary gas turbine exhaust flow 66 compensate for the large increase in the specific heat of the 300 bar (30 MPa) $CO_2$ stream at lower temperatures and cover the duties required by the total heating high pressure $CO_2$ flow. The cryogenic air separation plant 82 produces a product oxygen stream 49 at 30 bar (3 MPa) pressure and 99.5 mol % purity. The air feed stream 83 is compressed adiabatically in an axial compressor 69 with a coupled booster air compressor 70 both driven by an electric motor 71. The whole feed air stream is compressed in 69 to 5.7 bar (0.57 MPa). The air outlet 78 at 226° C. is used to heat an inlet 300 bar (30 MPa) $CO_2$ stream 74 from 50° C. to 220° C. in heat exchanger 73 giving outlet stream 75. This divides into two streams 76 and 77, which are introduced into intermediate points in heat exchangers 60 and 58, respectively, to provide further heat input at the lowest temperature level into the heating high pressure $CO_2$ streams 38 and 36. The main air feed stream 80 and the boosted air stream 81 at 65 bar (6.5 MPa) pressure, following cooling to near ambient temperature, enter the ASU 82.

The Allam cycle system comprises a turbine 17 with an associated combustor 13 coupled to an electric generator 16 producing an output 15. The natural gas fuel stream 11 is compressed to 320 bar (32 MPa) in a two stage intercooled compressor 12 driven by an electric motor 10. The natural gas is preheated in 68. The turbine is directly coupled to the main $CO_2$ recycle compressor 18, which has two stages with an intercooler 19. The inlet pressure in line 21 is 29 bar (2.9 MPa) and the discharge pressure in line 22 is 67 bar (6.7 MPa). The discharge flow 22 is cooled to near ambient temperature in heat exchanger 40 giving a $CO_2$ pump inlet flow 39 with a density of about 0.8 kg/liter. The pump discharge provides (in addition to the main $CO_2$ recycle flow 37) additional streams 36, 38 and 74 used for integration of the 7FB gas turbine. The net $CO_2$ produced from the combustion of the natural gas stream 14 is discharged at a pressure of 305 bar (30.5 MPa) as stream 84 for delivery to a pipeline. The main recuperative heat exchanger of the Allam cycle unit 61 cools the turbine exhaust stream 24 at 725° C. to 60° C., stream 41, which has stream 33 from the 7FB gas turbine integration system added thereto (stream 33 being a combination of stream 31 from heat exchanger 60 and stream 32 from heat exchanger 58 and stream 67 from heat exchanger 68). The combined stream 42 is cooled near ambient temperature in cooler 43 to produce stream 44 that enters separator 45 where condensed liquid water is separated, leaving as stream 46. The exit $CO_2$ gas stream 47 at 29 bar (2.9 MPa) divides into the main recycle $CO_2$ compressor inlet stream 21 and a stream 48 which mixes with pure oxygen stream 49 to produce an oxidant stream 50 with 25 mol % 02 content. This stream is compressed to 305 bar (30.5 MPa) in a multistage compressor 54 (with intercooler 54a) driven by an electric motor 52. The discharge stream 51 together with the recycle $CO_2$ stream 37 are heated to 715° C. in heat exchanger 61 against the turbine exhaust stream 24 to form stream 20 entering the combustor 13 and stream 23 entering the combustor exhaust stream to moderate the turbine 17 inlet temperature to about 1150° C.

The exemplified integrated system incorporates a specific model gas turbine which results in an efficient utilization of the heat available in the gas turbine exhaust. Larger and smaller gas turbines, however, can be used. Performance values based on the exemplified model are provided in Table 2.

TABLE 2

| Parameter | Integrated System |
| --- | --- |
| Total Net Power Output | 594.1 MW |
| Total Natural Gas Heat Input | 1040 MW |
| Total Net Efficiency | 57.131% |
| $O_2$ Input (99.5 mol % at 30 bar (3 MPa)) | 3546 MT/day |
| $CO_2$ Output (97 mol % purity at 150 bar) | 2556 MT/day |

The exemplified system can be used for integration of existing open cycle gas turbine units that compress ambient air as their working fluid. It is equally applicable to the closed cycle gas turbines using oxy-fuel combustors with the cooled turbine exhaust being used as gas turbine compressor feed following removal of produced $CO_2$, water inerts, and excess oxygen. For this type of gas turbine, virtually complete removal of $CO_2$ from the system is possible. For a conventional open cycle gas turbine, only the $CO_2$ derived from the Allam cycle can be removed for sequestration.

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

The invention claimed is:
1. A method of power production comprising:
carrying out a first cycle that includes:

expanding a work stream comprising recycled $CO_2$ across a first turbine to produce a first quantity of power;

withdrawing heat from the work stream in a recuperative heat exchanger;

compressing the work stream;

reheating the work stream using withdrawn heat in the recuperative heat exchanger; and superheating the compressed work stream in a combustor; and carrying out a nested cycle wherein compressed work stream from the first cycle is heated with a heat source that is independent of the combustor and the recuperative heat exchanger and is expanded across a second turbine to produce a second quantity of power.

2. The method of power production of claim 1, wherein the expanded work stream from the nested cycle is used to add heat to the work stream in the first cycle after the compressing and before the superheating.

3. The power production method of claim 1, wherein the heat source in the nested cycle is one or more of a combustion heat source, a solar heat source, a nuclear heat source, a geothermal heat source, and an industrial waste heat source.

4. A method for improving the efficiency of a power production cycle, the method comprising:

operating the power production cycle so that compressed, recycled $CO_2$ is passed through a combustor wherein a carbonaceous fuel is combusted with an oxidant to produce an exhaust stream comprising the compressed, recycled $CO_2$; the exhaust stream is expanded across a turbine to produce power and form a turbine exhaust stream comprising the recycled $CO_2$; the turbine exhaust stream is cooled in a recuperative heat exchanger; the cooled turbine exhaust stream is passed through a separator to separate the recycled $CO_2$; the recycled $CO_2$ is compressed; and the compressed recycled $CO_2$ is split into a first portion and a second portion with the first portion being heated by passage through the recuperative heat exchanger against the turbine exhaust stream; and adding further heating to the compressed recycled $CO_2$ above the level of heating that is available from the turbine exhaust stream, the further heating being provided by heating the second portion of the compressed recycled $CO_2$ with a heat source that is independent of the power production cycle and expanding across a second turbine to produce a second quantity of power, and transferring heat from the heated, second portion of the compressed recycled $CO_2$ to the first portion of the compressed recycled $CO_2$ in the power production cycle.

5. The method of claim 4, comprising passing the heated, second portion of the compressed recycled $CO_2$ through the recuperative heat exchanger so as to transfer heat to the first portion of the compressed recycled $CO_2$ therein.

6. The method of claim 4, comprising passing the heated, second portion of the compressed recycled $CO_2$ through a secondary heat exchanger to add the further heating thereto.

7. The method of claim 6, wherein after passage through the secondary heat exchanger, the heated, second portion of the compressed recycled $CO_2$ is combined with the first portion of the compressed recycled $CO_2$ in the recuperative heat exchanger.

* * * * *